United States Patent Office 3,187,000
Patented June 1, 1965

3,187,000
(AZABICYCLONONYLTHIO)AZOLES
John J. D'Amico, Dunbar, W. Va., assignor to Monsanto Company, a corporation of Delaware
No Drawing. Filed Aug. 5, 1964, Ser. No. 387,800
12 Claims. (Cl. 260—302)

The present invention relates to a class of new chemical products which are at the same time azoles and 3-azabicyclo[3.2.2]-nonanes. Although no class name exists for the new products they may be represented by the formula

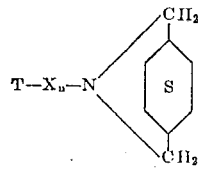

where T is the radical resulting from removing mercaptan hydrogen from an azole, X is sulfur or $CH_2$ and $n$ is zero or one. Suitable examples of azoles are 4-ethyl-2-mercaptothiazole,
4-methyl-2-mercaptothiazole,
4,5-dimethyl-2-mercaptothiazole,
4,5-diethyl-2-mercaptothiazole,
4-methyl-5-carboethoxy-2-mercaptothiazole,
4-methyl-5-carbomethoxy-2-mercaptothiazole,
4-carboethoxy-2-mercaptothiazole,
2-mercaptobenzothiazole,
4-ethyl-2-mercaptobenzothiazole,
4-methyl-2-mercaptobenzothiazole,
5-methyl-2-merctaptobenzothiazole,
5-ethyl-2-mercaptobenzothiazole,
6-methyl-2-merctaptobenzothiazole,
7-methyl-2-mercaptobenzothiazole,
4-chloro-2-mercaptobenzothiazole,
5-chloro-2-mercaptobenzothiazole,
6-chloro-2-mercaptobenzothiazole,
4-methoxy-2-mercaptobenzothiazole,
5-ethoxy-2-mercaptobenzothiazole,
6-ethoxy-2-mercaptobenzothiazole,
4,5-dimethyl-2-mercaptobenzothiazole,
4,6-dimethyl-2-mercaptobenzothiazole,
4,6-dimethyl-7-chloro-2-mercaptobenzothiazole,
4,6-dimethyl-5,7-dichloro-2-mercaptobenzothiazole,
2-mercaptobenzoxazole and
2-mercaptobenzimidazole.

It will be appreciated that the compounds conforming to the aforesaid general formula are not necessarily equivalent and the properties and uses vary depending upon the values of T, X and $n$. In general, the new compounds accelerate the vulcanization of natural and synthetic rubbers. Where $n$ is zero the resulting sulfenamides are potent accelerators of the delayed action type. They combine a high degree of processing safety at temperatures only slightly below curing temperature with very rapid curing properties at vulcanization temperature. Green tread stocks containing the new sulfenamides as accelerators possess superior storage stability. Where X is methylene and $n$ is 1, the compounds retain strong accelerating action but the delayed action properties largely disappear. These methylene compounds possess biological activity and more particularly destroy undesirable vegetation upon application to foliage. In some instances biological activity was observed with the sulfenamides but these were rarely toxic to plants. However, some of them are toxic to microorganisms.

There is some question as to whether the methylene radical in the products from azole, formaldehyde and 3-azabicyclo[3.2.2]nonane is linked to nitrogen in the azole ring or to sulfur outside the ring. For example the mercaptobenzothiazole derivative may be represented as

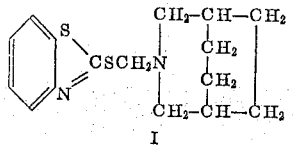

I or

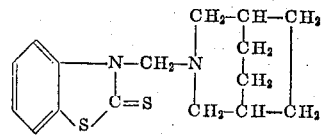

II

Evidence from ultra violet analysis indicates that essentially all the product is in the form of structure II but the invention is not limited to any theory of the precise configuration of the new compounds. It will be appreciated that T in the above formula when derived from mercaptobenzothiazole, for example by removing mercaptan hydrogen, may be either the benzothiazolylthio radical or its tautomer the benzothiazolinethione radical.

The following examples illustrate the invention including preparation of the new compounds but in no manner are to be construed as limitative. In these examples 3-azabicyclo[3.2.2]nonane is designated as "amine."

EXAMPLE 1

A solution was prepared comprising 34.4 grams (0.2 mole) of 97% 2-mercaptobenzothiazole, 17 grams (0.21 mole) of 37% formaldehyde and 200 ml. of acetone. This solution was heated at 55–56° C. for one hour to effect solution. While continuing the stirring there was added to the solution at 25° C. in one portion 25 grams (0.20 mole) of amine. A precipitate formed immediately and the temperature rose from 25 to 42° C. The reaction mixture was stirred at 25–30° C. for two hours and then cooled to 0° C. The precipitate was collected by filtration and air-dried at 25–30° C. 3-(3-azabicyclo[3.2.2] non-3-ylmethyl)-2-benzothiazolinethione was obtained in 98% yield. After recrystallization from alcohol the light tan solid melted at 134–136° C. Analysis gave 8.9% nitrogen and 21.3% sulfur compared to 9.2% nitrogen and 21.1% sulfur calculated for $C_{16}H_{20}N_2S_2$. The product was insoluble in heptane and water but soluble in ether, benzene, hot acetone and hot ethanol.

EXAMPLE 2

Following the procedure described in detail in Example 1, with the exception that 42.4 grams (0.2 mole) of 6-ethoxy-2-mercaptobenzothiazole was employed in place of 2-mercaptobenzothiazole, the temperature rose from 25 to 33° C. and a precipitate formed after 15 minutes. 3-(3 - azabicyclo[3.2.2]non - 3 - ylmethyl) - 6 - ethoxy-2-benzothiazolinethione was obtained in 79.5% yield as a gray solid. After recrystallization from alcohol it melted at 118–119° C. Analysis gave 8.1% nitrogen and 18.3% sulfur compared to 8.0% nitrogen and 18.4% sulfur calculated for $C_{18}H_{24}N_2OS_2$. The product was insoluble in water but soluble in ether, acetone, benzene, hot heptane and hot ethanol.

EXAMPLE 3

Again preceeding as described in Example 1, 40.3 grams (0.2 mole) of 5-chloro-2-mercaptobenzothiazole was substituted for 2-mercaptobenzothiazole. The temperature rose from 25 to 35° C. upon addition of the amine. The solution was cooled to −5° C. before filtration. 3-(3-azabicyclo[3.2.2]non-3-ylmethyl) - 5 - chloro - 2 - benzothiazolinethione was obtained in 34.2% yield as a cream solid. After recrystallization from alcohol it melted at 151–153° C. Analysis gave 8.2% nitrogen and 18.8 sulfur compared to 8.2% nitrogen and 18.9% sulfur calculated for $C_{16}H_{19}ClN_2S_2$. The product was insoluble in water and heptane but soluble in acetone, hot benzene, hot ethanol and slightly soluble in ether.

EXAMPLE 4

A solution comprising 45 grams (0.21 mole) of 6-ethoxy-2-mercaptobenzothiazole, 40 grams (0.316 mole) of amine and 300 ml. of isopropyl alcohol was stirred and heated at 45–50° C. for one hour. Thereupon there was added at 45–50° C. over a 2 hour period 165 ml. (0.316 mole) of sodium hypochlorite solution containing 14.28 grams hypochlorite per 100 ml. The temperature was held at 45–50° C. for an additional hour and then 5 grams of sodium sulfite and 1000 ml. of water were added. After cooling to 10° C., the precipitate was removed by filtration, washed with water until neutral to litmus and air-dried at 25–30° C. 3-(6-ethoxy-2-benzothiazolylthio)-3-azabicyclo[3.2.2]nonane was obtained in 98.5% yield as a brown solid. After recrystallization from heptane it melted at 117–118° C. Analysis gave 8.4% nitrogen and 18.8% sulfur compared to 8.4% nitrogen and 19.2% sulfur calculated for $C_{17}H_{22}N_2OS_2$. The product was insoluble in water but soluble in ether, acetone, benzene, hot heptane and hot ethanol.

EXAMPLE 5

In the procedure of Example 4, a solution comprising 50.4 grams (0.25 mole) of 5-chloro-2-mercaptobenzothiazole, 47 grams (0.375 mole) of amine and 300 ml. of isopropyl alcohol was used and the solution heated at 50–60° C. for one hour before addition of sodium hypochlorite. 3-(5-chloro-2-benzothiazolylthio)-3-azabicyclo[3.2.2]nonane was obtained in 69% yield melting at 101–102° C. after recrystallization from ethyl alcohol. Analysis gave 8.6% nitrogen and 11.2% chlorine compared to 8.6% nitrogen and 10.9% chlorine calculated for $C_{15}H_{17}ClN_2S_2$. The product was insoluble in water but soluble in ether, benzene, hot acetone, hot heptane and hot ethanol.

EXAMPLE 6

A solution comprising 50.8 grams (0.25 mole) of ethyl 2-mercapto-4-methyl-5-thiazolecarboxylate, 400 ml. of isopropyl alcohol and 47 grams (0.375 mole) of amine was stirred and heated at 45–50° C. for one hour, then cooled to 45° C. and 197 ml. (0.375 mole) of sodium hypochlorite solution containing 14.28 grams hypochlorite per 100 ml. added dropwise at 45–50° C. over a period of two hours. The solution was held at 45–50° C. for another hour and then 5 grams of sodium sulfite and 1000 ml. of water added. After cooling to 10° C., the precipitate was collected by filtration, washed with water until neutral to litmus and air-dried at 25–30° C. Ethyl 2-(3-azabicyclo[3.2.2]non-3-ylthio)-4-5-thioazolecarboxylate was obtained in 97% yield as a cream solid. After recrystallization from heptane it melted at 66–67° C. Analysis gave 8.6% nitrogen and 19.3% sulfur compared to 8.6% nitrogen and 19.6% sulfur calculated for $C_{15}H_{22}N_2O_2S_2$. It was soluble in ether, acetone, benzene, heptane and ethanol.

EXAMPLE 7

A solution comprising 32.8 grams (0.25 mole) of 4-methyl-2-mercaptothiazole, 300 ml. of isopropyl alcohol and 47 grams (0.375 mole) of amine was stirred and heated at 45–50° C. for one hour. Thereupon there was added below the surface at 45–50° C. over a two hour period 197 ml. (0.375 mole) of sodium hypochlorite solution containing 14.28 grams hypochlorite per 100 ml. The temperature was held at 45–50° C. for an additional hour and then 5 grams of sodium sulfite and 1000 ml. of water added. After cooling to 25° C. the reaction mixture was extracted with 400 ml. of ethyl ether, the ether solution washed with water until neutral to litmus and dried over sodium sulfate. The ether was removed in vacuo at a maximum temperature of 30° C./1–2 mm. An oily solid resulted in 97.5% yield. After recrystallization from ethyl alcohol, 3-(4-methyl-2-thiazolylthio)-3-azabicyclo[3.2.2]nonane was obtained as a tan solid melting at 69–70° C. The yield of the purified product was 51.7%. It contained 11.1% nitrogen and 24.7% sulfur compared to 11.0% nitrogen and 25.2% sulfur calculated for $C_{12}H_{18}N_2S_2$. Solubilities were similar to the product of Example 6.

EXAMPLE 8

A solution was prepared comprising 43.3 grams (0.25 mole) of 2-mercapto-4-methyl-5-thiazolyl methyl ketone, 300 ml. of isopropyl alcohol and 47 grams (0.375 mole) of amine. The solution was then heated and stirred at 45–50° C. for one hour whereupon there was added below the surface at 45–50° C. over a two hour period 197 ml. (0.375 mole) of sodium hypochlorite solution containing 14.28 grams hypochlorite per 100 ml. The temperature was held at 45–50° C. for an additional hour, then reduced to 25° C. and 5 grams of sodium sulfite, 500 ml. of water and 500 ml. of ethyl ether added. The reaction mixture was stirred at 25–30° C. for 15 minutes, the top ether layer separated, washed with water until neutral to litmus and dried over sodium sulfate. The ether was removed in vacuo at a maximum temperature of 30° C./1–2 mm. The oil obtained was dissolved in heptane-ethyl alcohol and allowed to stand for 24 hours. After cooling to 0° C. the precipitate was filtered and dried at 25–30° C. 2-(3-azabicyclo[3.2.2]-non-3-ylthio)-4-methyl-5-thiazolyl methyl ketone was obtained in 20.2% yield as a yellow solid melting at 128–130° C. Analysis gave 9.3% nitrogen and 20.7% sulfur compared to 9.4% nitrogen and 21.6% sulfur calculated for $C_{14}H_{20}N_2OS_2$. Solubilities were similar to those of Example 6.

EXAMPLE 9

In the procedure of Example 6, 41.6 grams (0.125 mole) of 2,2'-dithiobis benzothiazole was substituted for the thiazole of that example and 123 ml. (0.225 mole) of sodium hypochlorite solution containing 13.6 grams hypochlorite per 100 ml. added dropwise at 45–50° C. over a two hour period. After isolating the product as described it was air-dried at 50° C. 3-(2-benzothiazolylthio)-3-azabicyclo[3.2.2]nonane was obtained in 99% yield as a light tan solid. After recrystallization from heptane it melted at 98–99° C. Analysis gave 9.3% nitrogen and 22.1% sulfur compared to 9.7% nitrogen and 22.1% sulfur calculated for $C_{15}H_{18}N_2S_2$. The product was insoluble in water and heptane, soluble in acetone and benzene and slightly soluble in ether and ethanol.

EXAMPLE 10

A charge comprising 87.2 grams (0.3 mole) of the product of Example 9, 9.6 grams of sulfur, 3.75 grams (0.3 mole) of amine and 300 ml. of ethyl alcohol was heated at refluxing temperature (75–80° C.) for two hours. The stirred solution was then cooled to 0° C. and 100 ml. of heptane added. After maintaining the product at −10 to 0° C. for an hour, the precipitate was collected by filtration and air-dried at 25–30° C. 3-(2-benzothiazolyldithio)-3-azabicyclo[3.2.2]nonane was obtained in 95.5% yield as a light yellow solid. After recrystallization from alcohol it melted at 113–115° C. Analysis gave 8.4% nitrogen and 29.9% sulfur compared to 8.7% nitrogen and 29.8% sulfur calculated for $C_{15}H_{18}N_2S_3$. The product was insoluble in water but soluble in ether, acetone, benzene, and hot ethanol and slightly soluble in hot heptane.

Rubbers in which the products of the present invention are useful as accelerators include both natural rubber and synthetic rubber. Rubber includes sulfur vulcanizable diene polymers, preferably those containing a major proportion of diene polymer and preferably hydrocarbon rubbers but includes copolymers of diene hydrocarbons and acrylonitrile and isobutylene copolymerized with a small amount of diene (butyl rubber). Isoprene or butadiene-1,3 copolymers with vinyl monomers copolymerizable therewith, as for example styrene, are illustrative. The new sulfenamides are superior to accelerators heretofore available for synthetic stereo specific rubbers like cis-1,4-polybutadiene. The invention will be further illustrated in connection with the data in the tables below.

A typical natural rubber tire tread stock was compounded by milling together the ingredients in the following base formula:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Antioxidant | 1.0 |
| Sulfur | 2.5 |

To the above there was added in separate stocks 0.5 part of accelerator as follows:

| Stock | |
|---|---|
| A | 3-(2-benzothiazolylthio)-3-azabicyclo[3.2.2]nonane. |
| B | 3-(6-ethoxy-2-benzothiazolylthio)-3-azabicyclo[3.2.2]nonane. |
| C | Ethyl 2-(3-azabicyclo[3.3.2]non-3-ylthio)-4-methyl-5-thiazole-carboxylate. |
| D | 3-(4-methyl-2-thiazolylthio)-3-azabicyclo[3.2.2]nonane. |
| E | 3-(5-chloro-2-benzothiazolylthio)-3-azabicyclo[3.2.2]nonane. |
| F | 2-(3-azabicyclo[3.2.2]non-3-ylthio)-4-methyl-5-thiazolyl methyl ketone. |
| G | 3-(3-azabicyclo[3.2.2]non-3-ylmethyl)-6-ethoxy-2-benzothiazolinethione. |
| H | 3-(3-azabicyclo[3.2.2]non-3-ylmethyl)-2-benzothiazolinethione. |
| J | 3-(3-azabicyclo[3.2.2]non-3-ylmethyl)-5-chloro-2-benzothiazolinethione. |

The above stocks so compounded were cured in the usual manner by heating in a press at 144° C. The modulus and tensile properties of the 45 minute cures are recorded below:

*Table I*

| Stock | Modulus of elasticity in lbs./in.² at 300% elongation | Tensile at break in lbs./in.² |
|---|---|---|
| A | 2,830 | 4,750 |
| B | 2,570 | 4,800 |
| C | 2,840 | 4,770 |
| D | 2,940 | 4,860 |
| E | 2,770 | 4,750 |
| F | 2,670 | 4,050 |
| G | 2,210 | 4,250 |
| H | 2,510 | 4,580 |
| J | 2,570 | 4,460 |

The product of Example 10 is both vulcanizing agent and accelerator. Eliminating the sulfur from the above base stock and adding 4.7 parts of the product of Example 10 resulted in a stock which after heating 30 minutes at 144° C. developed a tensile strength of 4200 pounds per square inch and at the same time possessed considerable processing safety.

In a similar manner the new compounds were tested as vulcanization accelerators in a synthetic rubber tire tread stock. Butadiene-styrene copolymer rubber was blended in a standard formula as follows:

| | Parts by weight |
|---|---|
| SB-R 1500 | 100.0 |
| Carbon black | 50.0 |
| Zinc oxide | 4.0 |
| Stearic acid | 2.0 |
| Saturated hydrocarbon softener | 10.0 |
| Antioxidant | 1.0 |
| Sulfur | 1.75 |

The accelerator was added to the stock in molecularly equivalent amount employing 0.0045 mole of each accelerator.

| Stock | |
|---|---|
| K | 3-(2-benzothiazolylthio)-3-azabicyclo[3.2.2]nonane. |
| L | 3-(6-ethoxy-2-benzothiazolylthio)-3-azabicyclo[3.2.2]nonane. |
| M | 3-(5-chloro-2-benzothiazolylthio)-3-azabicyclo[3.2.2]nonane. |
| N | 3-(4-methyl-2-thiazolylthio)-3-azabicyclo[3.2.2]nonane. |
| O | Ethyl 2-(3-azabicyclo[3.2.2]non-3-ylthio)-4-methyl-5-thiazolecarboxylate. |
| P | Commercial sulfenamide accelerator. |

Processing safety of the vulcanizable mixes was evaluated by means of a Mooney plastometer. The figures recorded were the times required for the Mooney plasticity at 135° C. to rise ten points above the minimum value:

*Table II*

| Stock: | Mooney scorch in mins. at 135° C. |
|---|---|
| K | 33.4 |
| L | 32.7 |
| M | 33.3 |
| N | 27.2 |
| O | 30.9 |
| P | 25.4 |

The time for the Mooney scorch to rise from ten points above the minimum to thirty-five points above the minimum furnishes a measure of the cure rate. These results are shown in Table III.

*Table III*

| Stock: | Time for Mooney scorch to rise from 10 to 35 points above minimum |
|---|---|
| K | 2.6 |
| L | 2.7 |
| M | 2.9 |
| N | 1.9 |
| O | 2.2 |
| P | 3.5 |

The compositions were vulcanized by heating for different periods of time in the usual manner in a press at 144° C. The modulus and tensile properties of the 60-minute cures are recorded below:

*Table IV*

| Stock | Modulus of elasticity in lbs./in.² at 300% elongation | Tensile at break in lbs./in.² |
|---|---|---|
| K | 1,730 | 3,830 |
| L | 1,630 | 3,580 |
| M | 1,660 | 3,650 |
| N | 1,700 | 3,650 |
| O | 1,850 | 3,620 |
| P | 1,500 | 3,600 |

These data in Tables II, III and IV demonstrate the higher processing safety, faster curing and stronger acceleration of the products compared to a commercial delayed action accelerator. Substituting the molecularly equivalent amount (1.45 parts) of 3-(2-benzothiazolyldithio)-3-azabicyclo[3.2.2]nonane in the K stock further shortened the curing time. The stock developed a 300% modulus of 1880 pounds per square inch and an ultimate tensile of 3520 pounds per square inch after curing 30 minutes at 144° C. The time for Mooney scorch to rise from 10 to 35 points above the minimum was 2.9 minutes.

To demonstrate the effectiveness of the accelerators of this invention in cis-polybutadiene, the rubber was compounded by milling together the ingredients in the following base formula:

| | Parts by weight |
|---|---|
| Cis-1,4-polybutadiene | 100.0 |
| Aromatic oil softener | 5.0 |
| Pine tar | 5.0 |
| Stearic acid | 2.0 |
| Antioxidant | 1.0 |
| Zinc oxide | 3.0 |
| Carbon black | 50.0 |
| Sulfur | 1.75 |

To the above there was added in separate stocks 0.8 part of accelerator as follows:

| Stock | |
|---|---|
| Q | 3-(2-benzothiazolylthio)-3-azabicyclo[3.2.2]nonane. |
| R | Ethyl 2-(3-azabicyclo[3.2.2]non-3-ylthio)-4-methyl-5-thiazolecarboxylate. |
| S | 3-(5-chloro-2-benzothiazolylthio)-3-azabicyclo[3.2.2]nonane. |
| T | Commercial sulfenamide accelerator. |

Resistance to vulcanization at 135° C. of the stocks so compounded was determined as described above. The stocks were vulcanized by heating in a press for 30 minutes at 144° C. The vulcanizates were tested for stress, tensile strength and hardness. The results are recorded in Table V.

Table V

| Stock | Mooney scorch in mins. at 135° C. | Modulus of elasticity in lbs./in.² at 300% elongation | Tensile at break in lbs./in.² | Hardness |
|---|---|---|---|---|
| Q | 23.1 | 1,150 | 2,650 | 62 |
| R | 21.4 | 1,190 | 2,560 | 65 |
| S | 26.2 | 1,010 | 2,490 | 62 |
| T | 18.1 | 980 | 2,400 | 63 |

From the above data it may readily be seen that the new compounds are effective accelerators for cis-polybutadiene and are superior to the commercial delayed action accelerator in this respect. Also, they are far less scorchy as shown by the higher Mooney scorch values.

Smaller amounts of the accelerators may be employed than those indicated in the examples. Amounts as small as 0.1% by weight on the rubber as well as amounts higher than those specifically shown, as for example up to 5% by weight on the rubber, may be employed depending upon the nature of the rubber, the other compounding ingredients used and the objectives of the compounder.

The methylene compounds as for example the products of Examples 1, 2 and 3 also possess the property of promoting interaction of carbon black with elastomers. The rubber together with a relatively large amount of reinforcing pigment and 0.05-5% of the rubber of promoter are heated and masticated within the range of about 250-370° F. for a time sufficient to promote rubber-filler interaction. Curatives are then added and the stock vulcanized in the usual manner. Employing 0.3 part by weight of the product of Example 1 in a mixture of 75 parts smoked sheets, 25 parts styrene-butadiene copolymer rubber and 40 parts carbon black lowered the torsional hysteresis of the vulcanizate about 10%.

Herbicidal activity of the compounds was illustrated by application to the foliage of grasses and broadleaved plants. The toxicant was dispersed in water and the dispersion containing 0.5% of active ingredient shown in the table below was applied as a spray to the foliage and the effect on the plants recorded. A rating of 0 indicates no phytotoxicity, 1 slight phytotoxicity, 2 moderate phytotoxicity, 3 severe phytotoxicity and 4 plants dead. The plants are represented in the table by letters as follows:

A. Morning glory  H. Crab grass
B. Wild oat  J. Pigweed
C. Brome grass  K. Soybean
D. Rye grass  L. Wild buckwheat
E. Mustard (radish)  M. Tomato
F. Beet-sugar  N. Sorghum
G. Foxtail Table VI

| Active ingredient | Phytotoxicity rating | | | | | | | | | | | | |
|---|---|---|---|---|---|---|---|---|---|---|---|---|---|
| | A | B | C | D | E | F | G | H | J | K | L | M | N |
| Product of Example 1 | 1 | 1 | 0 | 1 | 3 | 4 | 3 | 3 | 4 | 1 | 0 | 1 | 0 |
| Product of Example 3 | 1 | 3 | 1 | 1 | 3 | 4 | 3 | 2 | 4 | 4 | 0 | 4 | 1 |
| Product of Example 10 | 1 | 1 | 2 | 4 | 4 | 2 | 2 | 3 | 4 | 0 | 1 | 2 | 1 |

It was further found that the product of Example 3, namely 3 - (3 - azabicyclo[3.2.2]non - 3 - ylmethyl) - 5-chloro-2-benzothiazolinethione, still killed pigweed at a solution concentration of 0.1%. The products of Examples 6 and 9 were toxic to mosquito larvae at a concentration of 10 parts per million and the product of Example 7 was found to be a repellent against army worm.

The toxicants are preferably applied in conjunction with a herbicidal adjuvant as carrier containing the active ingredient in a concentration within the range of about 0.1%-50.0% by weight. The active ingredients are soluble in common organic solvents as indicated above. It is therefore convenient to prepare a solution concentrate and disperse the solution in water to form an aqueous spray. Admixture with a small amount of an organic surface active agent capable of lowering the surface tension of water is preferred. Examples of surface active agents variously known as dispersing agents, wetting agents or emulsifying agents comprise soft or hard potassium soaps, morpholine or dimethylamine oleate, sulfonated fish, castor and petroleum oils, sodium salt of lignin sulfonic acid, alkylated aromatic sodium sulfonates, such as decylbenzene sodium sulfonate, dodecylbenzene sodium sulfonate, butyl or other amine salt of decyl or dodecylbenzene sulfonic acid, sodium lauryl sulfate, disodium monolauryl phosphate, ethylene oxide condensation products of alkyl phenols, as for example octyl phenol, ethylene oxide condensation products of tall oil, ethylene oxide condensation products of higher alcohols or higher mercaptans. Mixtures of two or more surface active agents are also feasible. Generally, the surface active agent will comprise only a small proportion of the composition, say 0.1-15% by weight of the toxicant.

The formulation of dry compositions for application as dusts or for further dilution with liquid carriers is readily accomplished by mixing the toxicant with a finely divided carrier. The latter will usually be in major proportions. Suitable carriers comprise talc, clay, pyrophyllite, silica, fuller's earth, diatomaceous earth and flours such as walnut shell, wheat, soya bean and cottonseed flours. Magnesium or calcium carbonate and calcium phosphate are suitable solid carriers. Adsorption on inert granules such as granular forms of fuller's earth provide effective forms more convenient to apply and use than dusts.

Although mercaptobenzoxazole is a much weaker accelerator than mercaptobenzothiazole, substitution of oxygen for sulfur in the thiazolyl radical of the new compounds retains accelerating properties to a surprising degree. Substitution of benzimidazole for mercaptobenzothiazole in the reaction leads to antioxidant properties. The preparation and properties of these compounds are described in detail below.

*Example 11*

A charge consisting of 37.8 grams (0.25 mole) of 2-mercaptobenzoxazole, 47 grams (0.375 mole) of amine and 300 ml. of isopropyl alcohol was stirred and heated at 45–50° C. for one hour. Thereupon there was added dropwise below the surface 196 ml. of sodium hypochlorite solution containing 14.05 grams hypochlorite per 100 ml. The temperature was held at 45–50° C. during the addition which required two hours. The reaction mixture was stirred for one hour longer at the same temperature, 5 grams of sodium sulfite and 1000 ml. of water added and the mixture cooled to 0° C. The precipitate was collected by filtration, washed with water until neutral to litmus and air-dried at 25–30° C. 3 - (2 - benzoxazolylthio) - 3 - azabicyclo[3.2.2] - nonane was obtained in 95% yield as a brown solid. After two recrystallizations from ethyl alcohol it melted at 79–80° C. Analysis gave 9.99% nitrogen and 11.74% sulfur compared to 10.21% nitrogen and 11.69% sulfur calculated for $C_{15}H_{18}N_2OS$.

As illustrative of accelerating properties, the following rubber stock was compounded:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Antioxidant | 3.0 |
| Sulfur | 2.5 |
| 3 - (2 - benzoxazolylthio) - 3 - azabicyclo-[3.2.2]-nonane | [1] 0.549 |

[1] 0.002 mole per 100 parts of rubber.

The compounded stock was cured by heating in a press for different periods of time at 144° C. The physical properties of the cured rubber product are set forth below:

*Table VII*

| Cure time in mins. | Modulus of elasticity in lbs./in.² at elongation of 300% | Tensile at break in lbs./in.² | Ultimate elongation, percent |
|---|---|---|---|
| 30 | 1,140 | 2,690 | 510 |
| 45 | 1,550 | 3,070 | 490 |

As further exemplary of the accelerating properties and processing safety, a rubber composition was prepared which contained a retarder of vulcanization. A vulcanizable composition was compounded comprising

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| N-Nitrosodiphenylamine | 1.0 |
| 3 - (2 - benzoxazolylthio) - 3 - azabicyclo-[3.2.2]-nonane | 0.549 |

The processing safety of the uncured composition was evaluated by means of a Mooney plastometer. The figure recorded was the time required for the Mooney plasticity at 135° C. to rise ten points above the minimum value. The stock was cured in the usual manner by heating in a press for different periods of time at 144° C. The vulcanizate was tested for stress and tensile strength. The results are recorded in Table VIII.

*Table VIII*

| Cure time in mins. | Modulus of elasticity in lbs./in.² at elongation of 300% | Tensile at break in lbs./in.² | Mooney scorch in mins. at 135° C. |
|---|---|---|---|
| 30 | 1,310 | 2,740 | |
| 45 | 1,810 | 3,370 | 18.1 |
| 60 | 1,950 | 3,550 | |

EXAMPLE 12

An equal molar portion of 2-mercaptobenzimidazole was substituted for the 2-mercaptobenzoxazole in Example 11. After heating and stirring the reactants for one hour at 45–50° C., 208 ml. (13.5 grams/100 ml.) of sodium hypochlorite was added dropwise below the surface. The temperature was held at 45–50° C. during the addition which required two hours. The reaction mixture was stirred for one hour longer at the same temperature and then cooled to 25° C. Thereupon there was added 5 grams of sodium sulfite, 800 ml. of water and 200 ml. of ethyl ether and the mixture cooled to 10° C. The precipitate was collected by filtration, washed with water until neutral and air-dried at 25–30° C. 3-(2-benzimidazolylthio)-3-azabicyclo[3.2.2]nonane was obtained as an off-white solid in 78% yield. After recrystallization from alcohol it melted at 193–195° C. Analysis gave 11.68% sulfur compared to 11.73% calculated for $C_{15}H_{19}N_3S$.

The product exhibits antioxidant properties in sulfur-vulcanizable rubber compositions. As illustrative of the usefulness for this purpose, rubber stocks were compounded comprising

| Stock | Parts by weight | |
|---|---|---|
| | U | V |
| Smoked sheets rubber | 100 | 100 |
| Carbon black | 50 | 50 |
| Zinc oxide | 5 | 5 |
| Stearic acid | 5 | 5 |
| Saturated hydrocarbon softener | 3 | 3 |
| Sulfur | 2.5 | 2.5 |
| Accelerator | 0.5 | 0.5 |
| 3-(2-benzimidazolylthio)-3-azabicyclo[3.2.2]nonane | | 1.5 |

The stocks were cured in the usual manner by heating in a press for 45 minutes at 144° C., aged and the proportion of original tensile strength retained after aging observed. In the results recorded below test tube aging refers to results by the test tube method A.S.T.M. designation D-865-57, A.S.T.M. Standards, 1958, p. 1453.

Table IX
PERCENT RETENTION OF ULTIMATE TENSILE STRENGTH

| Stock | Test Tube Aging | |
|---|---|---|
| | 24 hrs. at 100° C. | 48 hrs. at 100° C. |
| U | 44 | 18 |
| V | 65 | 35 |

To demonstrate anti-exposure cracking properties, tests were conducted by the stress relaxation method for measuring ozone cracking as described by Decker and Wise in Rubber World, April 1962, pp. 66–69. Accelerated tests performed in an ozone chamber were conducted under both dynamic and static conditions on natural rubber vulcanizates prepared from Stocks U and V above. The stocks in the static test were extended 25%. In the dynamic test a reciprocal mechanism imparted a 25% strain to the test pieces 90 times each minute. The extent of cracking in a test piece was determined by measuring the forces required to extend the test piece 100% before and after exposure to ozone. As the strip begins to crack, the number of stress supporting rubber chains decreases, and the force required to extend the test piece 100% is reduced. The ratio of this force to the original force is calculated and the ability of the rubber to resist ozone attack is obtained by a comparison of these numbers. These ratios are referred to as percent of original modulus. Table X records the results of ozone aging at approximately 25 p.p.h.m. $O_3$.

Table X

| Stock | Hrs. to 70% of original modulus | |
|---|---|---|
| | Static | Dynamic |
| U | 17 | 14 |
| V | 51 | 24 |

Stress relaxation measurements afforded another important demonstration of antidegradant properties. A weight was affixed to one end of a cured strip of rubber, the other end of which was maintained in a fixed position. Gradual relaxation of stress was followed by periodically measuring the elongation. The time for elongation to increase 100% was recorded. This test, commonly referred to as creep test, furnishes a reliable indication of fugitiveness of an antidegradant. The applied load was 45 pounds per square inch to the above stocks.

Table XI

Stock: Creep, hrs. to 100% increase in elongation
U ———————————————————— 12
V ———————————————————— 19

Although smoked sheet rubber has been selected as illustrative, 3 - (2-benzimidazolylthio)-3-azabicyclo[3.2.2]nonane may be employed for protection of natural rubber in its various forms, as for example latex, crepe, guttapercha, balata and cyclo rubbers as well as natural and synthetic elastomers which deteriorate by absorbing oxygen and ozone from the atmosphere, as for example polybutadiene, polyisoprene and polyisobutylene polymerized with a small proportion of a diolefin. The amounts used in the rubber will vary depending upon the particular stock and purpose of the compounder. In general, amounts within the range of 0.1–10% by weight of the rubber encompass the range normally used.

It is intended to cover all changes and modifications of the examples of the invention herein chosen for purposes of disclosure which do not constitute departures from the spirit and scope of the invention.

This application is a continuation-in-part of copending applications Serial No. 180,829, filed March 19, 1962, Serial No. 225,131, filed September 20, 1962 and Serial No. 225,132, filed September 20, 1962, all now abandoned.

What is claimed is:
1. A compound of the formula

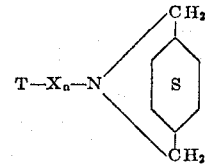

where T is the radical resulting from removing mercaptan hydrogen from an azole selected from the group consisting of 4 - (lower alkyl) - 2 - mercaptothiazole, 4,5 - di(lower alkyl)-2-mercaptothiazole, 4-(lower alkyl)-5-(lower carboalkoxy)-2-mercaptothiazole, 4- (lower carboalkoxy)-2-mercaptothiazole, 2-mercaptobenzothiazole, monochloro-2-mercaptobenzothiazole, mono- and di(lower alkyl)-2-mercaptobenzothiazole, mono(lower alkoxy)-2-mercaptobenzothiazole, mono(lower alkyl)-monochloro-2-mercaptobenzothiazole, di(lower alkyl) - dichloro-2-mercaptobenzothiazole, 2-mercaptobenzoxazole and 2-mercaptobenzimidazole, X is selected from a group consisting of sulfur and methylene and $n$ is an integer from zero to one inclusive.

2. 3-(2-benzothiazolylthio)-3-azabicyclo[3.2.2]nonane.
3. 3-(3-azabocyclo[3.2.2]non-3 - ylmethyl) - 2 - benzothiazolinethione.
4. 3 - (2 - benzothiazolyldithio) - 3 - azabicyclo[3.2.2] nonane.
5. 3 - (6 - ethoxy - 2 - benzothiazolylthio)-3-azabicyclo-[3.2.2]nonane.
6. 3 - (5 - chloro - 2 - benzothiazolylthio)-3-azabicyclo-[3.2.2]nonane.
7. 3 - (3 - azabicyclo[3.2.2]non - 3-ylmethyl)-6-ethoxy-2-benzothiazolinethione.
8. Ethyl 2-(3-azabicyclo[3.2.2]non-3-ylthio)-4-methyl-5-thiazolecarboxylate.
9. 3 - (4 - methyl-2-thiazolylthio)-3-azabicyclo[3.2.2] nonane.
10. 3 - (3 - azabicyclo[3.2.2]non-3-ylmethyl)-5-chloro-2-benzothiazolinethione.
11. 3 - (2 - benzoxazolylthio) - 3 - azabicyclo[3.2.2]nonane.
12. 3 - (2 - benzimidazolylthio)-3-azabicyclo[3.2.2]nonane.

No references cited.

IRVING MARCUS, *Primary Examiner*.